(12) United States Patent
Chung et al.

(10) Patent No.: US 10,394,343 B2
(45) Date of Patent: Aug. 27, 2019

(54) KEYBOARD CONTROL CIRCUIT

(71) Applicant: ASUSTEK COMPUTER INC., Taipei (TW)

(72) Inventors: Ming-Hung Chung, Taipei (TW); Yu-Chen Lee, Taipei (TW); Yao-Hsun Huang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/205,641

(22) Filed: Jul. 8, 2016

(65) Prior Publication Data

US 2017/0010685 A1 Jan. 12, 2017

Related U.S. Application Data (60) Provisional application No. 62/190,229, filed on Jul. 8, 2015.

(30) Foreign Application Priority Data

Jun. 8, 2016 (TW) .............................. 105118141 A (51) Int. Cl.
*G06F 3/023* (2006.01)
*A63F 13/22* (2014.01)
(Continued)

(52) U.S. Cl.
CPC ............ *G06F 3/0238* (2013.01); *A63F 13/22* (2014.09); *A63F 13/23* (2014.09); *G06F 3/0489* (2013.01)

(58) Field of Classification Search
CPC ........ G06F 3/02; G06F 3/0238; G06F 3/0489; G06F 19/00; A63F 13/22; A63F 13/23; H03M 11/02–18
See application file for complete search history.

(56) References Cited

U.S. PATENT DOCUMENTS

| 5,086,503 A | 2/1992 | Chung et al. |
| 6,650,254 B1 * | 11/2003 | Rix ........................ G06F 3/0202 341/20 |

(Continued)

FOREIGN PATENT DOCUMENTS

| TW | 502199 B | 9/2002 |
| TW | I224746 | 12/2004 |

(Continued)

*Primary Examiner* — Sardis F Azongha
(74) *Attorney, Agent, or Firm* — Muncy, Geissler, Olds & Lowe, P.C.

(57) ABSTRACT

A keyboard control circuit adapted to a keyboard device with a plurality of keys is provided. The keyboard control circuit comprises a combination key control unit, a key setting module and a processing module. When at least two keys of the keyboard device and a preset time are inputted, a combination signal of time stamping and sequence of keystrokes related to a function key is generated. The key setting module is used for receiving and transmitting a preset rule to the combination key control unit. When the function key for executing a control function is triggered, the keyboard device transmits a converting signal to the combination key control unit to convert the converting signal to the combination signal of time stamping and sequence of keystrokes and transmits the combination signal of time stamping and sequence of keystrokes to the processing module, and then the processing module executes the control function.

9 Claims, 8 Drawing Sheets

(51) Int. Cl.
*G06F 3/0489* (2013.01)
*A63F 13/23* (2014.01)

(56) References Cited

U.S. PATENT DOCUMENTS

| | | | |
|---|---|---|---|
| 6,722,984 B1* | 4/2004 | Sweeney, Jr. | A63F 13/06 341/176 |
| 8,656,150 B2* | 2/2014 | Huang | G06F 1/08 713/100 |
| 2003/0224843 A1 | 12/2003 | Wang | |
| 2007/0222761 A1* | 9/2007 | Wong | G06F 3/023 345/172 |
| 2008/0130553 A1* | 6/2008 | Takahashi | H04L 63/083 370/328 |
| 2008/0136783 A1 | 6/2008 | Pedrazzoli | |

FOREIGN PATENT DOCUMENTS

| | | |
|---|---|---|
| TW | 200834384 A | 8/2008 |
| TW | 200847027 A | 12/2008 |

\* cited by examiner

KEYBOARD CONTROL CIRCUIT

CROSS-REFERENCE TO RELATED APPLICATION

This application claims the priority benefit of U.S. provisional application Ser. No. 62/190,229, filed on Jul. 8, 2015 and TW application No. 105118141, filed on Jun. 8, 2016. The entirety of the above-mentioned patent applications are hereby incorporated by references herein and made a part of specification.

BACKGROUND OF THE INVENTION

Field of the Invention

The invention relates to a control circuit and, more specifically, to a keyboard control circuit.

Description of the Related Art

Generally, computer games are manipulated mainly via keyboards, mouses or a combination of them. Since various instructions can be output via a plurality of keys of the keyboard, the keyboard is always used as a main input unit for some of the games.

Conventionally, in some game settings, when a certain key combination is continuously pressed within a particular time interval, a corresponding function in the game is triggered. In an embodiment, in a fighting game, a player enables a combination key that combines multiple keys to trigger a function corresponding combat movement taken by a role. However, since a time interval between the keystrokes is usually preset for the composite key, the user may fail to input the composite key to make a corresponding instruction when the time interval between the keystrokes of the composite key does not conform to the pre-set time interval. In such a case, the user should press the keys of the composite key again and again until the composite key is successfully enabled. It is inconvenient for the user and the serve life of the frequently-used keys may be reduced.

BRIEF SUMMARY OF THE INVENTION

According to one aspect, a keyboard control circuit adapted to a keyboard device is provided. The keyboard device comprises a plurality of keys. The keyboard control circuit comprises a combination key control unit, a key setting module and a processing module. The combination key control unit is electrically connected to the keyboard device. When at least two keys of the keyboard device and a preset time are inputted, a combination signal of time stamping and sequence of keystrokes is generated, wherein the combination signal of time stamping and sequence of keystrokes is related to a function key.

The key setting module is used for receiving a preset rule and transmitting the preset rule to the combination key control unit. The processing module is electrically connected to the combination key control unit. When a function key for executing a control function is triggered, the keyboard device transmits a converting signal to the combination key control unit to convert the converting signal to the combination signal of time stamping and sequence of keystrokes according to the preset rule and transmits the combination signal of time stamping and sequence of keystrokes to the processing module, and then the processing module executes the control function according to the combination signal of time stamping and sequence of keystrokes.

In the keyboard control circuit of the embodiment, the combination key combination is defined by the user. Thus, the user can easily make an instruction indicated by the composite key via the combination key.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1:
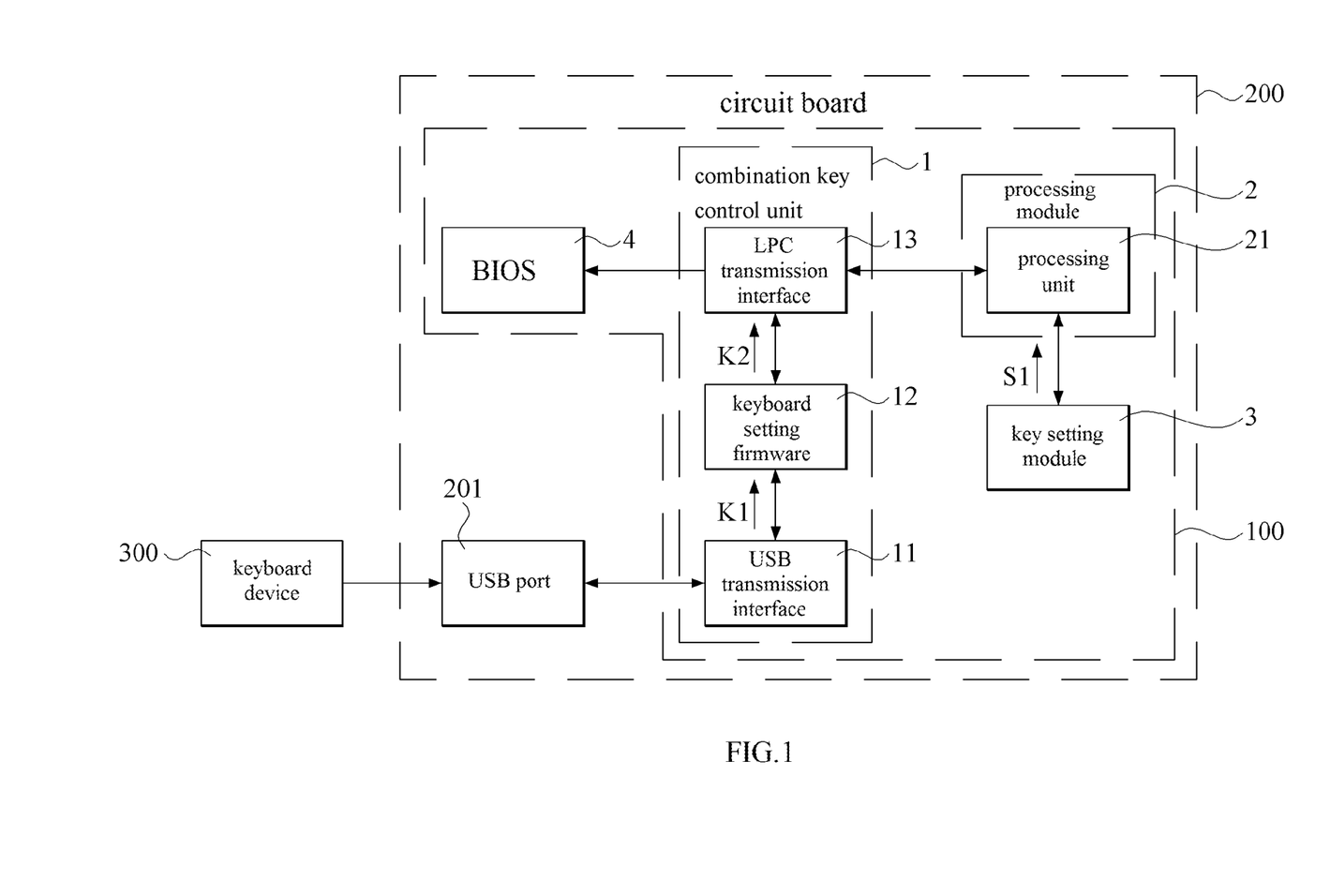
FIG. 1 is a schematic diagram showing a keyboard control circuit in an embodiment.

Please refer to FIG. 1, FIG. 1 is a schematic diagram showing a keyboard control circuit in an embodiment. As shown in FIG. 1, a keyboard control circuit 100 includes a combination key control unit 1, a processing module 2, a key setting module 3 and a basic input and output system (BIOS) 4. The keyboard control circuit 100 is configured at a circuit board 200. The circuit board 200 includes a Universal Series Bus (USB) port 201. The USB port 201 is electrically connected to a keyboard device 300. In an embodiment, the circuit board 200 includes several USB ports 201, and the keyboard device 300 is electrically connected to one of the USB ports 201.

Figure 2:
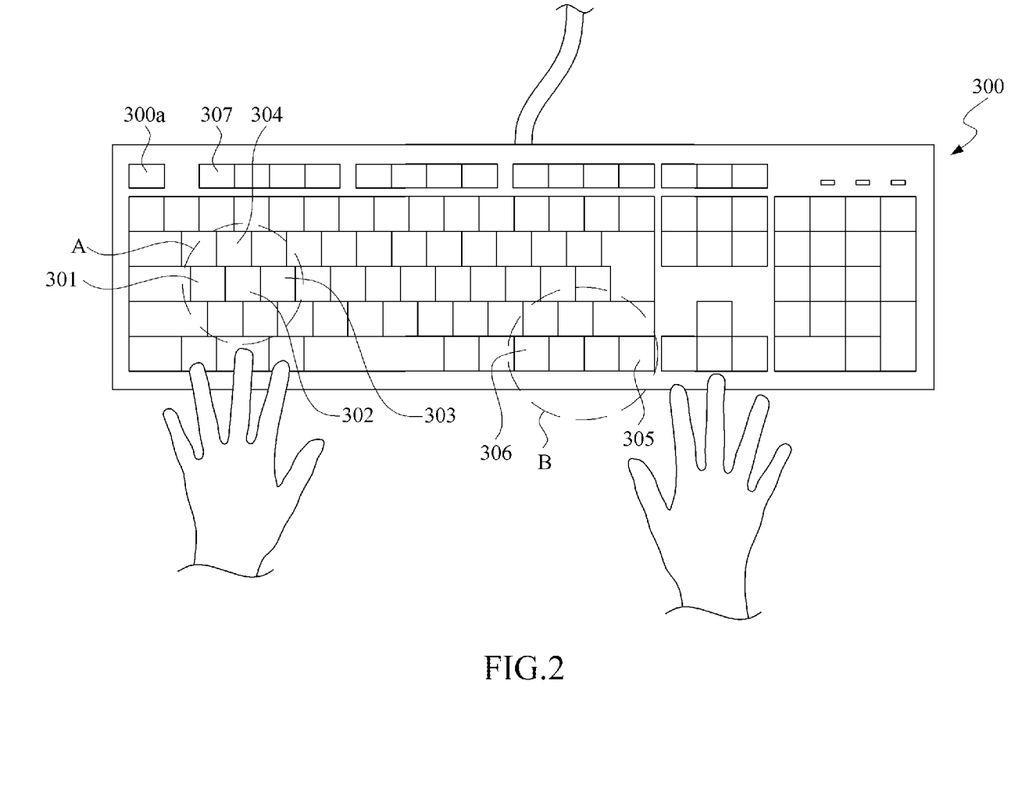
FIG. 2 is a plane view of a keyboard device which is electrically connected to a circuit board where a keyboard control circuit is configured at in an embodiment.
Figure 2A:
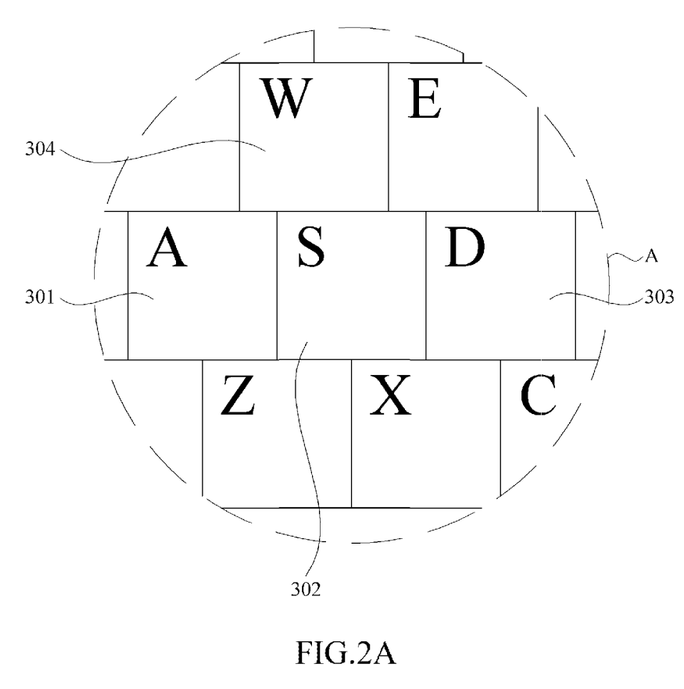
FIG. 2A is an enlarged view of a circled part A in FIG. 2.
Figure 2B:
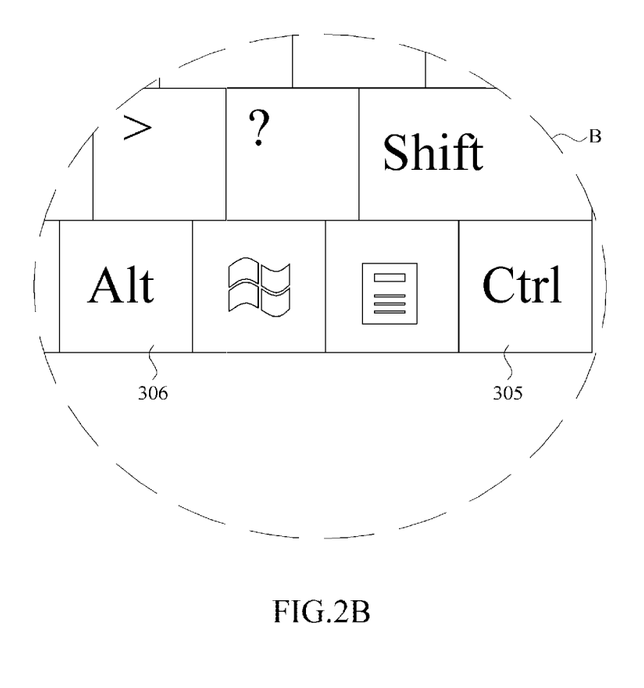
FIG. 2B is an enlarged view of a circled part B in FIG. 2.

Please refer to FIG. 2 to FIG. 2B, FIG. 2 is a plane view of a keyboard device which is electrically connected to a circuit board where a keyboard control circuit is configured at in an embodiment; FIG. 2A is an enlarged view of a circled part A in FIG. 2, and FIG.B is an enlarged view of a circled part B in FIG. 2. As shown in the figures, the keyboard device 300 includes a plurality of keys 300a (the number 300a of a key is shown as an example, and seven keys 301, 302, 303, 304, 305, 306 and 307 are exemplified in the embodiment). The keys 301, 302, 303, 304, 305, 306 and 307 are A key, S key, D key, W key, Ctrl key, Alt key and F1 key, respectively. In the embodiment, the A key, the S key, the D key and the W key represent ←(left), ↓(down), →(right) and ↑(up), respectively, while the Ctrl key and the Alt key represent tap and thump, respectively, in the game.

Please refer to FIG. 1 to FIG. 2B, as shown in the figures, the combination key control unit 1 includes a USB transmission interface 11, a keyboard setting firmware 12 and a Low Pin Count Bus (LPC) transmission interface 13.

The USB transmission interface 11 is electrically connected to the USB port 201, and thus the USB transmission interface 11 is electrically connected to the keyboard device 300 via the USB port 201.

In an embodiment, the combination key control unit 1 includes the keyboard setting firmware 12. The keyboard setting firmware 12 is electrically connected to the USB transmission interface 11 to receive a plurality of stroke signals from the keyboard device 300 via the USB transmission interface 11 and the USB port 201. In the embodiment, the keyboard setting firmware 12 analyzes a keystroke timing sequence combination of which at least two keys of the keys 300a and a preset time are inputted, a combination signal of time stamping and sequence of keystrokes K2 is generated. The combination signal of time stamping and sequence of keystrokes K2 is a continuous signal consisting of multiple stroke signals.

The LPC transmission interface 13 is electrically connected to the keyboard setting firmware 12 to send out the combination signal of time stamping and sequence of keystrokes K2 received from the keyboard setting firmware 12.

The processing module 2 is electrically connected to the LPC transmission interface 13 of the combination key control unit 1 to receive the combination signal of time stamping and sequence of keystrokes K2. The processing module 2 executes a corresponding control function according to the combination signal of time stamping and sequence of keystrokes K2.

The key setting module 3 is electrically connected to the processing unit 21 of the processing module 2, and thus the key setting module 3 is electrically connected to the combination key control unit 1 via the processing module 2. The key setting module 3 is used for setting a preset rule. According to the preset rule, one of the keys 300a is set as a function key and a combination of other keys is set to have a relationship with the function key. Then, a setting signal S1 indicating the preset rule is transmitted to the processing unit 21 and the preset rule is stored in the keyboard setting firmware 12 by the processing unit 21 via the LPC transmission interface 13.

In an embodiment, in the embodiment, the key 307 is set as the function key. A converting signal K1 generated when the key 307 is triggered is defined as the combination signal of time stamping and sequence of keystrokes K2. The preset rule is transmitted to be stored in the keyboard setting firmware 12 of the combination key control unit 1. When the keyboard setting firmware 12 of the combination key control unit 1 receives the converting signal K1, the converting signal K1 is converted to the combination signal of time stamping and sequence of keystrokes K2 and the combination signal of time stamping and sequence of keystrokes K2 is transmitted to the processing unit 21. The processing unit 21 executes a corresponding control function according to the received combination signal of time stamping and sequence of keystrokes K2. In the embodiment, the key setting module 3 is a storage device where a key setting application is installed for the user to set the preset rule.

Figure 3:
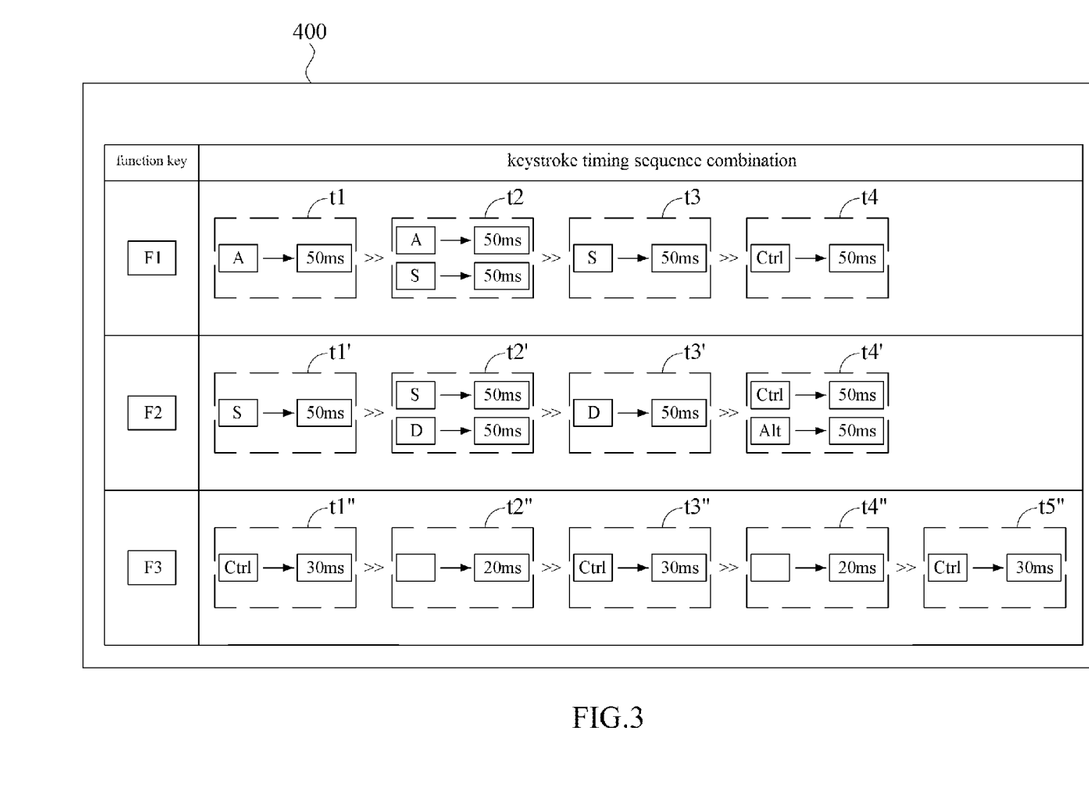
FIG. 3 is a schematic diagram showing a setting interface of a key setting module that is displayed on a display screen.
Figure 4:
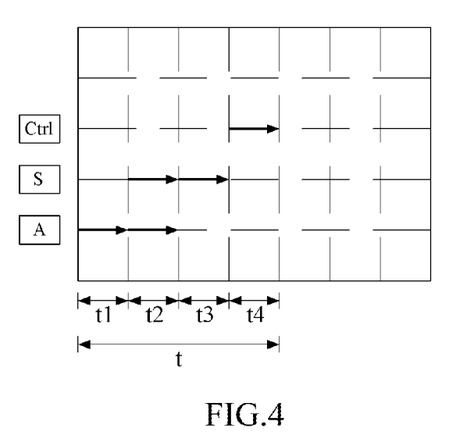
FIG. 4 is a schematic diagram showing a keystroke timing sequence of a keystroke timing sequence combination when a function key for display is F1 key.

Please refer to FIG. 3 and FIG. 4, FIG. 3 is a schematic diagram showing a setting interface by a key setting module that is displayed on a display screen, FIG. 4 is a schematic diagram showing a keystroke timing sequence of a keystroke timing sequence combination when a function key for display is the F1 key. As shown in the FIG. 3, in the embodiment, a setting interface is displayed on a display screen 400 for the user to set the function key and the keystroke timing sequence combination via the keyboard or the mouse, and then at least one stroke time slot and at least one non-stroke time slot are arranged based on a key-triggering sequence. In an embodiment, in the embodiment, "←↙↓+Ctrl" listed in a combat movement table of the game and is used for triggering a particular combat movement, is set via the setting interface of the key setting module 3 that is displayed on the display screen 400.

In an embodiment, the F1 key is set as the function key in a function key column (as shown in FIG. 3). In a corresponding keystroke timing sequence combination column, a stroke signal for the A key is set to be outputted continuously for 50 ms (millisecond) during a stroke time slot t1, then, a stroke signal for the A key and the S key is set to be outputted continuously for 50 ms during a stroke t2, and then the stroke signal for the S key is set to be outputted continuously for 50 ms during a stroke time slot t3, and at last, a stroke signal for the Ctrl key is set to be outputted continuously for 50 ms during a stroke time slot t4.

As shown in FIG. 4, after the setting signal S1 indicating the settings of the function key and the keystroke timing sequence combination in FIG. 3 is stored in the keyboard setting firmware 12 via the key setting module 3, when the key 307 is pressed and the converting signal K1 for the F1 key is transmitted to the keyboard setting firmware 12, the combination signal of time stamping and sequence of keystrokes K2 corresponding to the converting signal K1 is transmitted to the processing unit 21 by the keyboard setting firmware 12 according to the settings of the preset rule. The keystroke timing sequence combination indicated by the combination signal of time stamping and sequence of keystrokes K2 refers to a combination of the A key, the S key and the Ctrl key within a preset time t.

The preset time t includes four stroke time slots t1, t2, t3 and t4. During the stroke time slot t1, the stroke signal for the A key is outputted continuously for 50 ms, then, the stroke signal for the A key and the S key is outputted continuously for 50 ms during the stroke time slot t2, then, the stroke signal for the S key is outputted continuously for 50 ms during the stroke time slot t3, and at last, the stroke signal for the Ctrl key is outputted continuously for 50 ms during the stroke time slot t4. In such a way, the user only needs to press the key 307 of the keyboard device 300, and a signal representing that the key 301, the key 302 and the key 305 are pressed sequentially within the preset time t is received by the processing unit 21. Then, the processing unit 210 executes a corresponding combat movement in the game according to the keystroke sequence.

Figure 5:
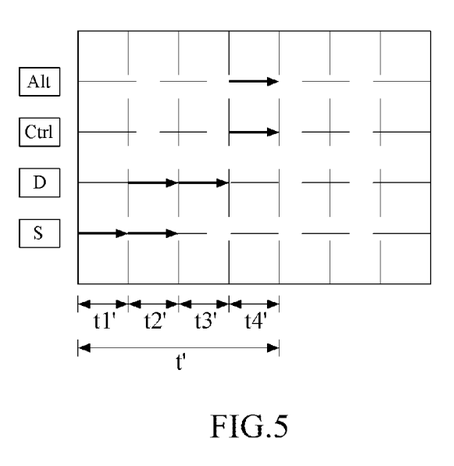
FIG. 5 is a schematic diagram showing a keystroke timing sequence of a keystroke timing sequence combination when a function key for display is F2 key.
Figure 6:
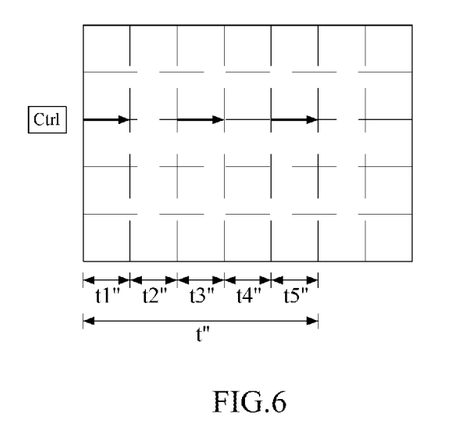
FIG. 6 is a schematic diagram showing a keystroke timing sequence of a keystroke timing sequence combination when a function key for display is F3 key.

Please refer to FIG. 3, FIG. 5 and FIG. 6, FIG. 5 is a schematic diagram showing a keystroke timing sequence of a keystroke timing sequence combination when a function key for display is F2 key, FIG. 6 is a schematic diagram showing a keystroke timing sequence of a keystroke timing sequence combination when a function key for display is F3 key.

As shown in the figures, when a key representing F2 key is pressed and a converting signal K1 corresponding to the F2 key is transmitted to the keyboard setting firmware 12, a combination signal of time stamping and sequence of keystrokes K2 corresponding to the converting signal K1 is transmitted to the processing unit 21 by the keyboard setting firmware 12 according to the settings of the preset rule. The keystroke timing sequence combination indicated by the combination signal of time stamping and sequence of keystrokes K2 refers to a combination of the S key, the D key, the Ctrl key and the Alt key within a preset time t'.

The preset time t' includes four stroke time slots t1', t2', t3' and t4'. The stroke signal for the S key is outputted continuously for 50 ms during the stroke time slot t1', then, the stroke signal for the S key and the D key is outputted continuously for 50 ms during the stroke time slot t2', then, the stroke signal for the D key is outputted continuously for 50 ms during the stroke time slot t3', and at last, the stroke signal for the Ctrl key and the Alt key is outputted continuously for 50 ms during the stroke time slot t4'. In such a way, the user only needs to press the key representing the F2 key of the keyboard device 300, and a signal representing that the key 302, the key 303, the key 305 and the key 306 are pressed sequentially within the preset time t' is received by the processing unit 21.

Similarly, when a key representing F3 key is pressed and a converting signal K1 corresponding to the F3 key is outputted to the keyboard setting firmware 12, a combination signal of time stamping and sequence of keystrokes K2 corresponding to the converting signal K1 is outputted to the processing unit 21 by the keyboard setting firmware 12 according to the settings of the preset rule. The keystroke timing sequence combination indicated by the combination signal of time stamping and sequence of keystrokes K2 refers to a combination of the Ctrl keys within a preset time t". The preset time t" includes three stroke time slots t1", t3" and t5" and two non-stroke time slots t2" and t4". The sequence of the stroke time slots t1", t3" and t5" and the non-stroke time slots t2" and t4" is set as follows: the stroke time slot t1", the non-stroke time slot t2", the stroke time slot t3", the non-stroke time slot t4" and the stroke time slot t5" according to the key-triggering sequence.

During the stroke time slot t1", the stroke signal for the Ctrl key is outputted continuously for 30 ms, then, the sending of any signal is stopped for 20 ms during the non-stroke time slot t2", then, the stroke signal for the Ctrl key is outputted continuously for 30 ms during the stroke time slot t3", then, the sending of any signal is stopped for 20 ms during the non-stroke time slot t4", and the stroke signal for the Ctrl key is outputted continuously for 30 ms during the stroke time slot 5". In such a way, the user only needs to press the key representing the F3 key of the keyboard device 300, and a signal representing that the key 305 is pressed repeatedly within the preset time t" is received by the processing unit 21.

Figure 7:
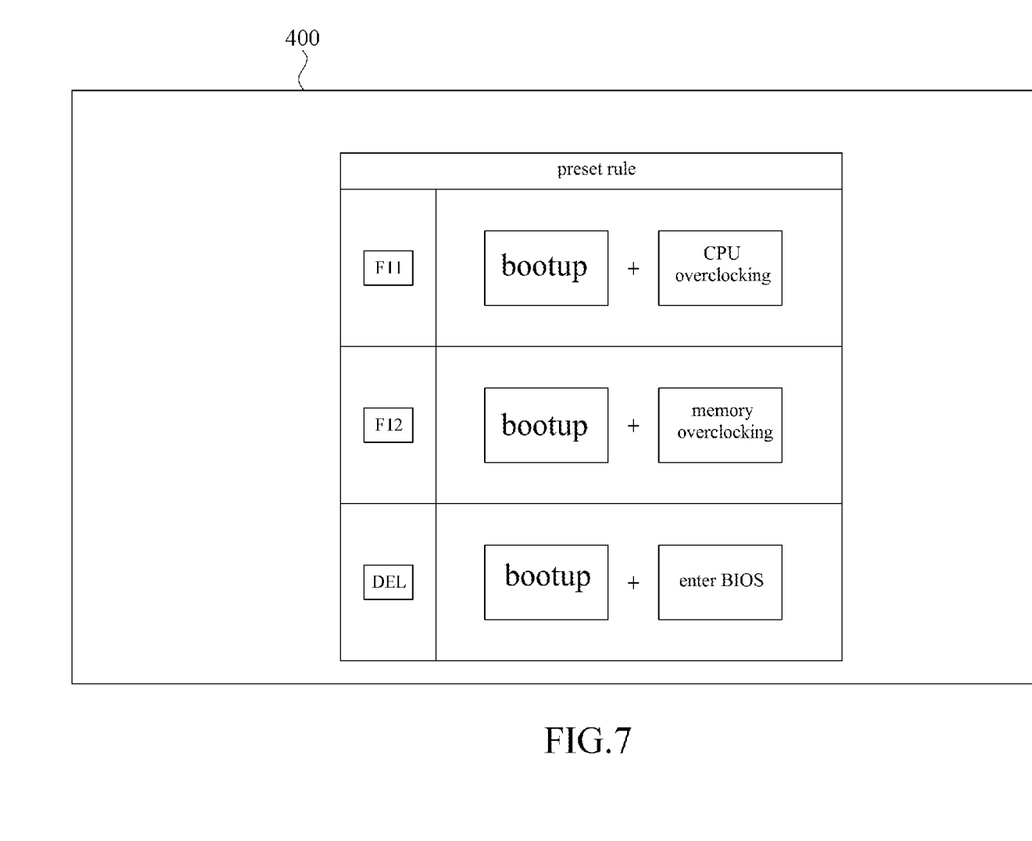
FIG. 7 is a schematic diagram showing a preset rule setting interface of a key setting module that is displayed on a display screen in an embodiment.

Please referring to FIGS. 3 and FIG. 7, FIG. 7 is a schematic diagram showing a preset rule setting interface of a key setting module that is displayed on a display screen in an embodiment. As shown in the figures, a preset rule is built in the keyboard setting firmware 12 of the combination key control unit 1. In an embodiment, in the embodiment, F11 key, F12 key and DEL key are preset as the preset function keys. When the keyboard setting firmware 12 receives a preset converting signal corresponding to the preset function key, a corresponding preset function signal is transmitted to the basic input and output system (BIOS) 4. The preset function signal includes a system bootup and processor (CPU) overclocking signal, a system bootup and memory overclocking signal and a system bootup and BIOS-entering signal.

When the F11 key is pressed before the computer boots, a corresponding preset converting signal (not shown in the figures) is transmitted by the keyboard device 300. When the keyboard setting firmware 12 receives the preset converting signal, a preset function signal is transmitted to the basic input and output system (BIOS) 4, and then the system is driven to boot to enter a processor overclocking mode by the basic input and output system (BIOS) 4.

Similarly, when the F12 key is pressed before the computer boots, a corresponding preset converting signal is transmitted by the keyboard device 300. When the keyboard setting firmware 12 receives the preset converting signal, a preset function signal is transmitted to the basic input and output system (BIOS) 4, and then the system is driven to boot to enter a memory overclocking mode by the basic input and output system (BIOS) 4.

In an embodiment, when the DEL key is pressed before the computer boots, a corresponding preset converting signal is transmitted by the keyboard device 300. When the keyboard setting firmware 12 receives the preset converting signal, a preset function signal is transmitted to the basic input and output system (BIOS) 4, and then the system is driven to boot to enter a BIOS setting mode by the basic input and output system (BIOS) 4.

Conventionally, the stroke signals from the keyboard device are transmitted one by one to the processing unit in sequence by the USB control chip. Therefore, in the game, the user needs to press a series of keys of the keyboard device, and then a series of stroke signal are outputted to the processing unit to execute the corresponding combat movement. However, the combat movement usually cannot be triggered when the key-presses are not pressed completely, and the service life of the frequently-used keys is reduced.

In the embodiments of the keyboard control circuit, the combination key control unit with the keyboard setting firmware receives the converting signal from the keyboard device, converts the converting signal to the combination signal of time stamping and sequence of keystrokes according to the preset rule (which is set via the key setting module by the user), and sends the combination signal of time stamping and sequence of keystrokes to the processing module. The processing module executes the corresponding control function corresponding to the combination signal of time stamping and sequence of keystrokes according to the combination signal of time stamping and sequence of keystrokes.

In other words, by setting the preset rule, only one function key needs to be pressed, and then the combination signal of time stamping and sequence of keystrokes including multiple stroke signals sequenced according to the key-triggering sequence is outputted by the combination key control unit. The processing module receives the multiple stroke signals orderly according to the key-triggering sequence, and executes the corresponding control function. It's easy for the user to manipulate, and the service life of the keys is prolonged.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A keyboard control circuit, adapted to a keyboard device having a plurality of keys, the keyboard control circuit comprising:
  a combination key control unit electrically connected to the keyboard device, when at least two keys of the keyboard device and a preset time are inputted, a combination signal of time stamping and sequence of keystrokes is generated, wherein the combination signal of time stamping and sequence of keystrokes is related to a function key, and the function key is different from the at least two keys;
  a key setting module for receiving a preset rule and transmitting the preset rule to the combination key control unit; and
  a processing module electrically connected to the combination key control unit;

wherein when the function key for executing a control function is triggered, the keyboard device transmits a converting signal to the combination key control unit to convert the converting signal to the generated combination signal of time stamping and sequence of keystrokes according to the preset rule and transmits the combination signal of time stamping and sequence of keystrokes to the processing module, and then the processing module executes the control function according to the combination signal of time stamping and sequence of keystrokes;

wherein the preset time for the keys includes at least one stroke time slot and at least one non-stroke time slot, and at least two of the keys are outputted during at least one of the stroke time slot.

2. The keyboard control circuit according to claim 1, wherein the preset rule is that the converting signal transmitted by the keyboard device when the function key is triggered is defined as the combination signal of time stamping and sequence of keystrokes.

3. The keyboard control circuit according to claim 1, wherein the stroke time slot and the non-stroke time slot are arranged according to a key-triggering sequence.

4. The keyboard control circuit according to claim 3, wherein the key setting module provides a setting interface for a user to arrange the stroke time slot and the non-stroke time slot according to the key-triggering sequence.

5. The keyboard control circuit according to claim 1, wherein the keyboard control circuit further includes a basic input and output (BIOS) system electrically connected to the combination key control unit, a preset rule is built in the combination key control unit to allow the combination key control unit to send a preset function signal to the basic input and output system when the combination key control unit receives the preset converting signal.

6. The keyboard control circuit according to claim 5, wherein the preset function signal comprises a system boot up and processor overclocking signal, and the system is driven to boot up and enter a processor overclocking mode by the basic input and output system according to the system boot up and processor overclocking signal.

7. The keyboard control circuit according to claim 5, wherein the preset function signal includes a system boot up and memory overclocking signal, and the system is driven to boot up to enter a memory overclocking mode by the basic input and output system according to the system boot up and memory overclocking signal.

8. The keyboard control circuit according to claim 5, wherein the preset function signal includes a system boot up and BIOS-entering signal, and the system is driven to boot up to enter a BIOS setting mode by the basic input and output system according to the system boot up and BIOS-entering signal.

9. The keyboard control circuit according to claim 1, wherein a setting interface of the key setting module is displayed on a display screen.

* * * * *